United States Patent [19]

Broekhuizen et al.

[11] 4,239,455
[45] Dec. 16, 1980

[54] BLADE-MOUNTED CENTRIFUGAL PENDULUM

[75] Inventors: Willem Broekhuizen; Troy M. Gaffey, both of Arlington; Mukund M. Joglekar, Euless; William D. Neathery, Fort Worth, all of Tex.

[73] Assignee: Textron, Inc., Providence, R.I.

[21] Appl. No.: 941,134

[22] Filed: Sep. 11, 1978

[51] Int. Cl.³ .............................................. B64C 27/32
[52] U.S. Cl. ..................................... 416/145; 416/500
[58] Field of Search ................. 416/144, 145, 500, 18

[56] References Cited

U.S. PATENT DOCUMENTS

| | | | |
|---|---|---|---|
| 2,426,130 | 8/1947 | Wald | 416/145 |
| 2,519,762 | 8/1950 | Hoffmann et al. | 416/145 |
| 2,638,170 | 5/1953 | Prewitt | 416/145 |
| 2,934,151 | 4/1960 | Jenney | 416/138 A X |
| 3,035,643 | 5/1962 | Kelly et al. | 416/18 |
| 3,289,770 | 12/1966 | Derschmidt | 416/18 X |
| 3,372,758 | 3/1968 | Jenney | 416/145 X |
| 3,540,809 | 11/1970 | Paul | 416/145 X |
| 3,874,818 | 4/1975 | Saunders et al. | 416/144 |
| 3,887,296 | 6/1975 | Mills et al. | 416/145 |
| 3,932,060 | 1/1976 | Vincent et al. | 416/145 |
| 3,988,073 | 10/1976 | Eastman et al. | 416/145 |

FOREIGN PATENT DOCUMENTS

| | | | |
|---|---|---|---|
| 672424 | 3/1939 | Fed. Rep. of Germany | 416/18 |
| 754033 | 8/1956 | United Kingdom | 416/18 |

*Primary Examiner*—Everette A. Powell, Jr.
*Attorney, Agent, or Firm*—Richards, Harris & Medlock

[57] ABSTRACT

A helicopter having a multiblade main rotor lift unit includes a plurality of pendulus mass units (48,60) mounted to oscillate in the plane of the rotor. The mass units (48,60) are connected to a rotatable shaft (24) which passes through a blade grip (14) for each blade (16). Vibrations generated in the plane of the rotor system are damped by the oscillating pendulums (22) which are tuned to minimize the vibrations in the lift unit.

10 Claims, 4 Drawing Figures

U.S. Patent Dec. 16, 1980 Sheet 1 of 2 4,239,455 ns per minute. The inplane vibrations are thus at a
BLADE-MOUNTED CENTRIFUGAL PENDULUM

TECHNICAL FIELD

This invention relates to vibration isolation in helicopters, and more particularly to a vibration absorbing centrifugal pendulum connected to the helicopter rotor grip.

BACKGROUND ART

Vibration is a problem in helicopters. An oscillatory hub sheer is produced at the rotor hub of the lift unit of a two blade helicopter, for example, with a frequency that is three times that of the revolution rate of the rotor, i.e., three per revolution. Although the hub shear oscillation is transverse to the axis of the rotor, this force is transmitted to the fuselage of the helicopter as a moment about the center of the gravity of the rotor. This moment in turn produces vertical vibrations within the helicopter fuselage. The intensity of the vibrations in a helicopter is a vital factor in determining the lifetime of fatigue critical components. Efforts have been made and continue to be made to attenuate or eliminate these vibrations in order to extend the operational life of the aircraft.

The problem of hubshear vibrations in a helicopter rotor has been addressed in U.S. Pat. No. 3,540,809 to Paul et at. Inplane rotor vibrations are absorbed by means of bifilar vibration dampers which rotate with the helicopter rotor. The bifilar dampers oscillate with the rotating mast and are tuned to absorb the vibrations generated at a particular frequency. Further vibration absorber devices are disclosed in U.S. Pat. No. 3,372,758 to Jenney and U.S. Pat. No. 3,035,643 to Kelley et. al.

Despite the development of the above vibration absorbers there exists a need for a grip-mounted, tunable, free pendulum for damping inplane vibrations.

DISCLOSURE OF THE INVENTION

In accordance with the present invention an improved system is provided for reducing vibrations at the hub of a helicopter rotor system which includes a plurality of blades secured to a mast-hub by way of blade grips. The vibration dampening system comprises a pair of pivot means one extending through each of the grips diametrically opposed, parallel, and equidistant from the axis of the rotor. Masses are mounted in the form of a simple pendulum on each pivot with the center of gravity of the masses located in the region of the feathering axis of the blade on which the pendulum is mounted.

BRIEF DESCRIPTION OF DRAWINGS

For a more complete understanding of the present invention and the advantages thereof, reference is now made to the following description taken in conjunction with the accompanying drawings in which.

DETAILED DESCRIPTION

Figure 1:
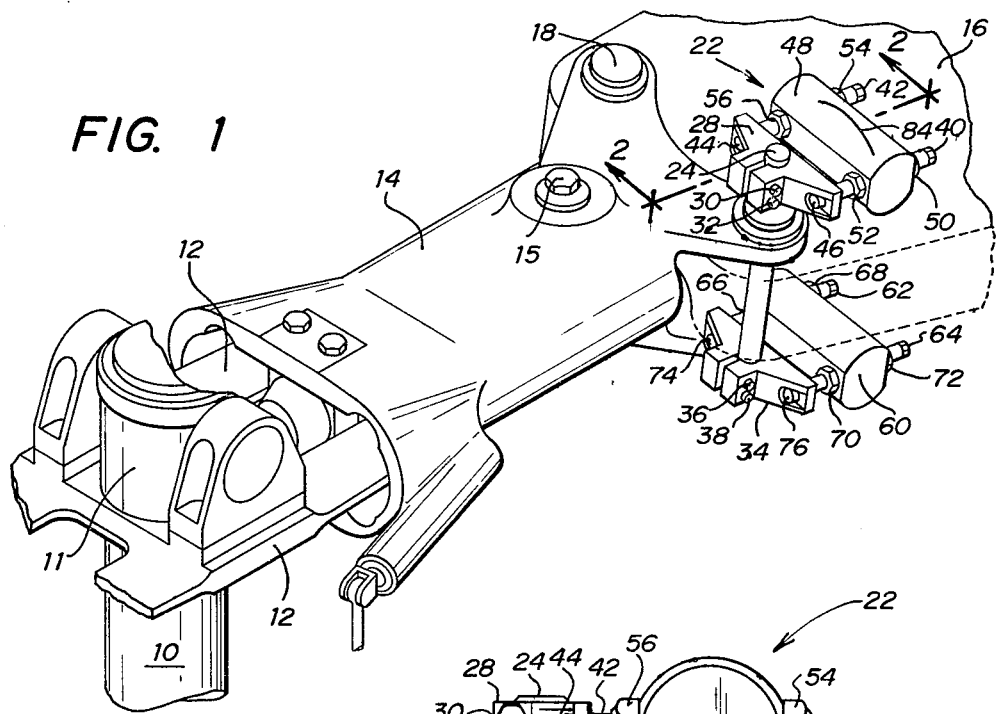
FIG. 1 is a top perspective view illustrating a helicopter mast, grip, yoke, blade and vibration damping pendulum in accordance with the present invention.
Figure 2:
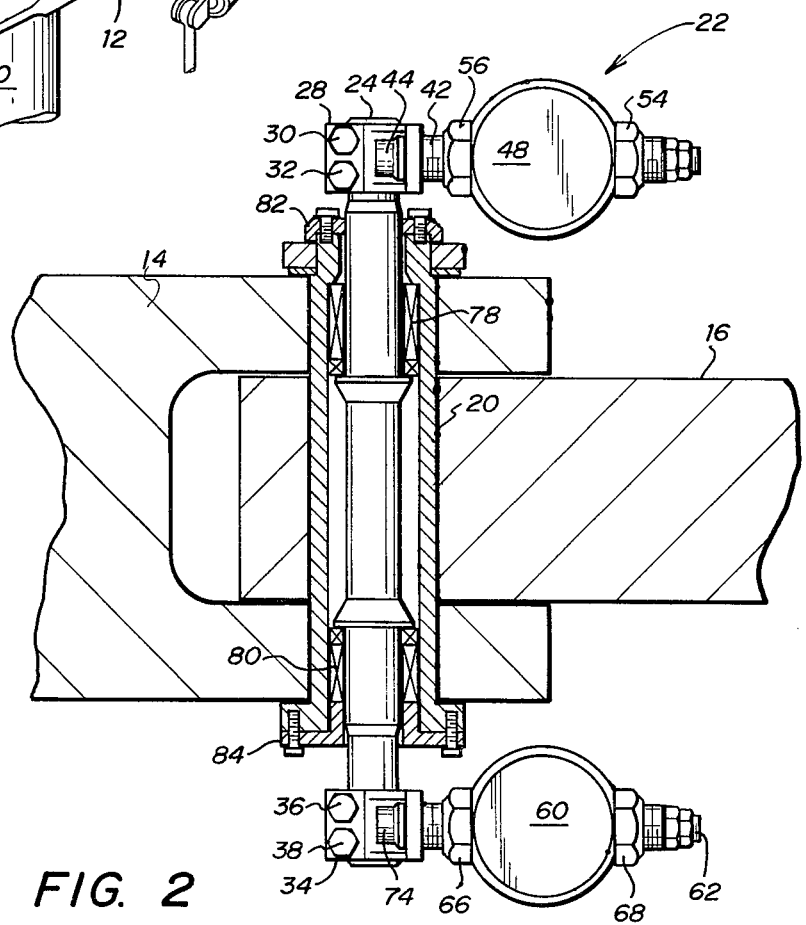
FIG. 2 is a sectional view taken along lines 2—2 of the pendulum shown in FIG. 1.

Referring now to FIGS. 1 and 2, a mast 10 supports a yoke 12 which is connected to a grip 14. A rotor blade segment 16 is supported and retained by the grip 14. The blade segment 16 is attached to the grip 14 by a blade bolt 18 and by a sleeve 20 within a pendulum assembly 22. The pendulum assembly 22 includes a shaft 24 extending through grip 14 and blade segment 16. An upper clamp 28 is attached to shaft 24 by means of bolts 30 and 32. A lower clamp 34 is attached to shaft 24 by means of bolts 36 and 38.

Support arms 40 and 42 are disposed transverse to the shaft 24 and are connected to the upper clamp 28 by means of nuts 44 and 46. A weight 48 is slidably mounted on the support arms 40 and 42 and is held in position by nuts 50 and 52 on support arm 40 and nuts 54 and 56 on support arm 42.

A lower weight 60 is slidably mounted on support arms 62 and 64 and is secured on support arm 62 by nuts 66 and 68 and on support arm 64 by nuts 70 and 72. Support arm 62 is secured to lower clamp 34 by means of a nut 74 and support arm 64 is secured to the lower clamp 34 by a nut 76.

Shaft 24 is rotatably mounted on bearings 78 and 80 which are fixed between the shaft 24 and the sleeve 20.

The pendulum assembly 22 is held in place axially by means of an upper cap 82 and a lower cap 84 both of which are secured to the grip 14.

As the structure in FIG. 1 vibrates due to blade action and air loading, the vibration forces are transmitted through the mast 10 to the helicopter fuselage (not shown). The vibration forces exist primarily in the plane of a rotor blade segment 16. The vibrations are generated in response to the rotation of the blade segments and include components at a frequency of three times the rotation rate.

The inplane oscillatory vibrations are substantially reduced by means of the pendulum assembly 22 of the present invention. The weights 48 and 60 are free to rotate about the axis of the shaft 24. When the helicopter is in operation, grip 14 and blade 16 rotate at the rotor speed and the weights 48 and 60 are forced radially outward by means of centrifugal force. Under the centrifugal force the pendulum weights assume a radial outward position and do not vary from this position unless affected by an external force. An additional force is applied to the rotor blades and grip by the oscillatory inplane vibrations described above. These vibrations cause the pendulum weights to be displaced and therefore to swing along the arc 84 shown in FIG. 1, the pendulum oscillating at the rate of the inplane vibrations.

In order to minimize the oscillatory inplane vibrations, it is necessary that the pendulum assembly 22 be tuned to have a weight distribution which causes it to generate forces that counteract the inplane vibrations to the extent of holding the mast 10 essentially stationary. Pendulum assembly 22 is tuned by moving weights 48 and 60 to selected distances from shaft 24, so vibration at the mast hub is minimized. This is done by positioning weight 48 along arms 40 and 42, and weight 60 along arms 62 and 64 by means of adjustment of the nuts retaining the weights. For example, the rotor speed of a Bell Helicopter Company model M409 is 276 revolutions per minute. The inplane vibrations are thus at a frequency of 828 hertz. The pendulum assembly 22 in the rotor system is therefore tuned by moving the weights 48 and 60 until the inplane hub vibrations are minimized.

When the pendulum assembly 24 has been tuned to minimize inplane vibrations, it will be seen that the natural frequency of the pendulum assembly in the centrifugal force field created by the spinning rotor is close to but not exactly that of the frequency of the vibrations. The pendulum assembly 24 must also be carefully adjusted so that the pendulum forces oppose rather than add to the blade vibrations.

Figure 3:
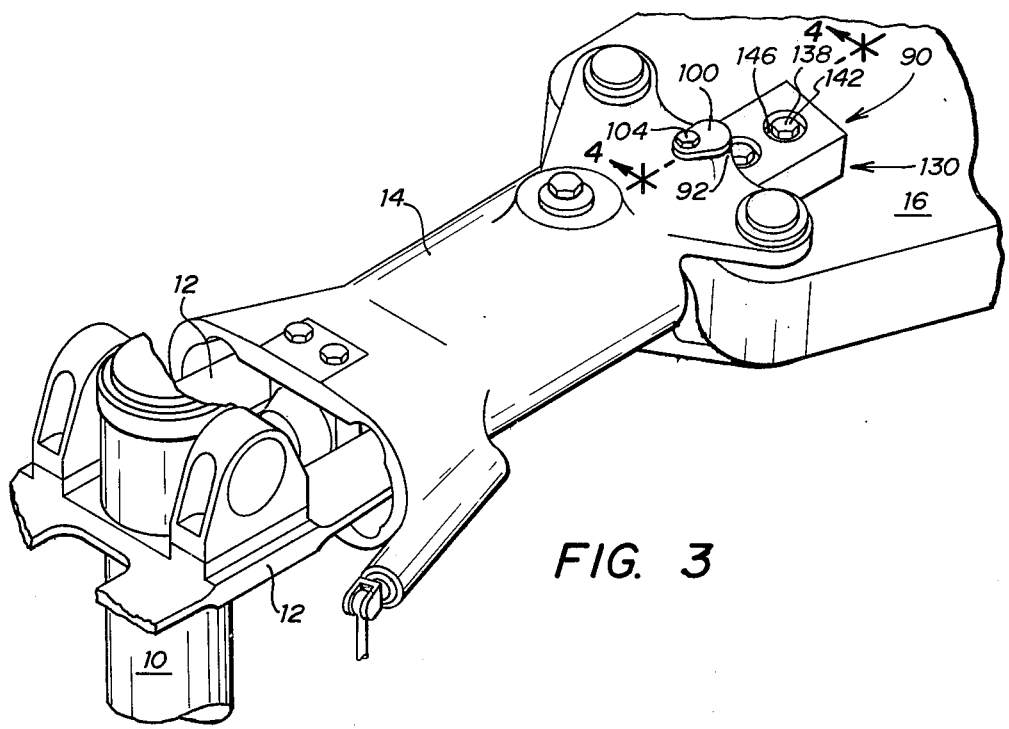
FIG. 3 is a top perspective view illustrating a helicopter mast, grip, yoke, blade and a further vibration damping pendulum in accordance with the present invention.
Figure 4:
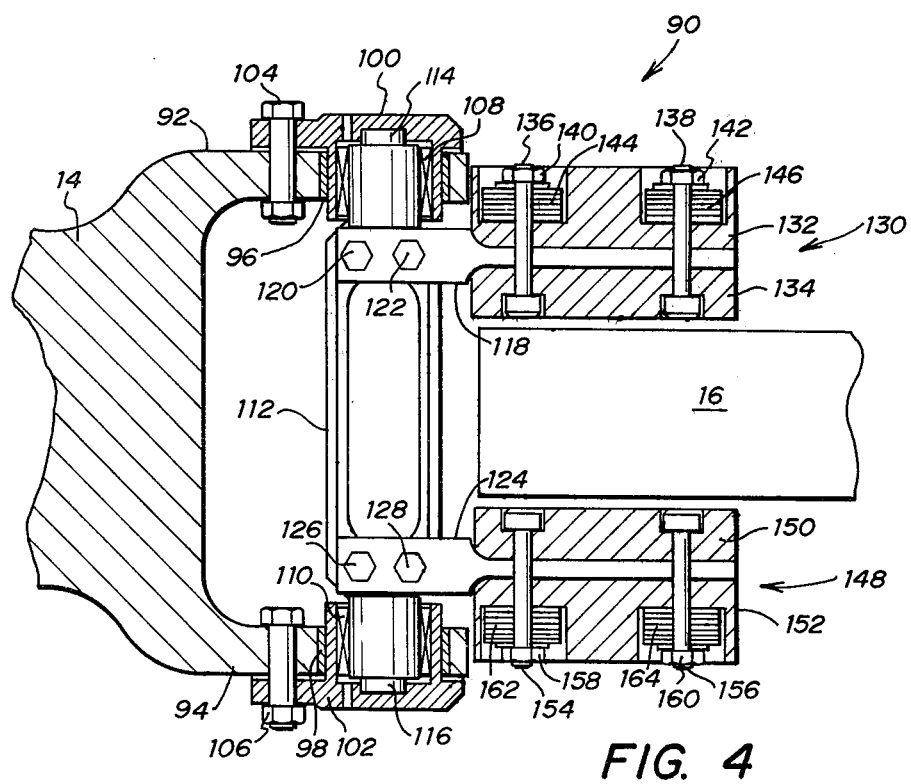
FIG. 4 is a sectional view taken along lines 4—4 of the pendulum in FIG. 3.

A further embodiment of the present invention is shown in FIGS. 3 and 4. A pendulum assembly 90 is attached to a grip 14 and yoke 12 as shown in FIG. 3. Lugs 92 and 94 are added to the upper and lower sections of the grip 14. Sleeves 96 and 98 are disposed within the lugs 92 and 94 respectively in order to axially position caps 100 and 102. Bolts 104 and 106 join caps 100 and 102 respectively to grip 14. Located within the caps are bearings 108 and 110 which support a shaft 112. Thrust plugs 114 and 116 are disposed at each end of the shaft 112 to absorb axial forces transmitted through shaft 112.

An arm 118 is clamped around the upper section of the shaft 112 by means of bolts 120 and 122. A second arm 124 is clamped around the lower section of the shaft 112 by means of bolts 126 and 128.

A pendulum weight assembly 130 comprising blocks 132 and 134 is attached to the arm 118 by means of bolts 136 and 138. Nuts 140 and 142 are threaded on the bolts 136 and 138 to secure the blocks 132 and 134 to the arm 118 and to hold in place washer sets 144 and 146.

A second pendulum weight assembly 148 has blocks 150 and 152 secured to the arm 124 by means of bolts 154 and 156 held in place by nuts 158 and 160. The nuts also secure washer sets 162 and 164 to the block 152.

The assembly illustrated in FIGS. 3 and 4 operates essentially in the same manner as that described above. However, the response of the pendulum system is selected by the addition or deletion of weight from the pendulum weight assemblies rather than by changing the position of the weight along a moment arm. The weight is varied by changing the number of washers in the washer assemblies 144, 146, 162 and 164. More or less washers can be used to produce a precisely tuned pendulum to respond to the inplane vibration which is desired to be damped.

The centrifugal pendulums of the present invention are disposed on the inner feathering sections of the rotor blade segments reducing wind friction and decreasing the number of components through which vibrations are carried. Further, by moving with the pitch of the blades, the pendulums partially damp vibrations out of the plane of the rotor.

Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention.

We claim:

1. Apparatus for reducing vibrations at the hub of a helicopter rotor assembly which has a plurality of blades, each affixed to a blade grip that is secured to the hub which is mounted on a rotatable mast, the combination comprising:
   (a) a pair of pivot means, one extending through each said grip diametrically opposed and equidistant from the axis of said mast and substantially perpendicular to the chord axis of the blade adjacent said pivot means, and
   (b) masses mounted in the form of simple pendulums, two on each said pivot means and symmetrical to the feathering axis of the adjacent blade.

2. Apparatus according to claim 1 further including means for tuning the response of said pendulums.

3. Apparatus according to claim 2 wherein said means for tuning comprises a weight positionable at selected distances from said pivot means.

4. Apparatus according to claim 2 wherein said means for tuning comprises a plurality of incremental weights attachable to said pendulums in selected numbers.

5. Vibration reduction apparatus for a helicopter lift assembly which includes a plurality of rotor blades each secured to a blade grip, said grips connected to a hub that is mounted on a mast, comprising in combination:
   (a) a rotatable shaft disposed within each of said grips, said shafts essentially parallel to the axis of said mast,
   (b) A support rigidly connected to each of said shafts with said supports being free to move in a plane essentially parallel to the plane of said rotor blades, and
   (c) a mass joined to each of said supports to form a pendulum pivotable about said shaft.

6. Vibration reduction apparatus according to claim 5 further including means for positioning the center of gravity of said pendulum at predetermined distances from said shaft to select the response of said pendulum.

7. Vibration reduction apparatus according to claim 6 wherein said means for positioning comprises a threaded shaft joined to said support, said mass positionable on said threaded shaft by a nut engaged thereto.

8. Vibration reduction apparatus according to claim 6 wherein said means for positioning comprises a plurality of incremental weights attachable to said pendulum in selected numbers.

9. Apparatus for reducing vibration at the hub of a helicopter rotor system which includes a plurality of blades, the combination comprising:
   (a) a blade grip for securing each blade to said hub, said blade grip having upper and lower projecting lugs with a hole formed in each said lug, said holes being colinear,
   (b) a shaft adapted to fit between said lugs, the ends of said shaft disposed in said holes,
   (c) bearing means disposed about said shaft within each of said holes to support said shaft while allowing said shaft to rotate,
   (d) a cap member joined to each lug of said grip, covering said hole in said lug and maintaining said shafts axially within said grip,
   (e) a first arm rigidly joined to said shaft adjacent a first of said lugs of said grip, said first arm movable essentially parallel to the plane of said blades,
   (f) a second arm rigidly joined to said shaft adjacent a second of said lugs of said grip, said second arm movable essentially parallel to the plane of said blades,
   (g) a first mass rigidly coupled to said first arm, and a second mass rigidly coupled to said second arm, said masses of a magnitude to damp inplane vibrations generated by said blades.

10. The combination according to claim 9 wherein each of said masses comprises,
   (a) a plate having a hole therein,
   (b) a bolt threadedly connected to said first plate, and
   (c) weight members secured to said plate by means of said bolt.

* * * * *